United States Patent [19]
MacWilliams et al.

[11] Patent Number: 6,112,016
[45] Date of Patent: *Aug. 29, 2000

[54] METHOD AND APPARATUS FOR SHARING A SIGNAL LINE BETWEEN AGENTS

[75] Inventors: Peter D. MacWilliams, Aloha; Norman J. Rasmussen, Hillsboro, both of Oreg.; Nicholas D. Wade, Vancouver, Wash.; William S. F. Wu, Cupertino, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,632

[22] Filed: Mar. 27, 1997

Related U.S. Application Data

[62] Division of application No. 08/420,494, Apr. 12, 1995, Pat. No. 5,651,137.

[51] Int. Cl.[7] ..................................................... G06F 13/00
[52] U.S. Cl. ................ 395/287; 395/200.62; 395/200.67
[58] Field of Search ..................................... 395/287, 293, 395/280, 200.62, 200.67, 200.68, 200.3

[56] References Cited

U.S. PATENT DOCUMENTS

| | | | |
|---|---|---|---|
| 4,719,569 | 1/1988 | Ludemann et al. | 395/729 |
| 5,201,051 | 4/1993 | Koide | 395/725 |
| 5,230,043 | 7/1993 | Ichihashi et al. | 395/200 |
| 5,291,529 | 3/1994 | Crook et al. | 375/109 |
| 5,408,636 | 4/1995 | Santeler et al. | 395/490 |
| 5,418,914 | 5/1995 | Heil et al. | 395/325 |
| 5,524,237 | 6/1996 | Bestler et al. | 395/550 |
| 5,551,005 | 8/1996 | Sarangdhar et al. | 395/472 |
| 5,568,617 | 10/1996 | Kametani | 395/280 |
| 5,572,703 | 11/1996 | MacWilliams et al. | 395/473 |
| 5,764,935 | 6/1998 | Bechtolsheim et al. | 395/325 |

OTHER PUBLICATIONS

PCI Local Bus Specification, Revision 2.0; PCI Special Interest Group; Hillsboro, OR; Apr. 1993.
Intel, :Pentium Processor User's Manual Volume 2: 82496 Cache Controller and 82491 SRAM Data book, 1994, P5–114 to 5–115.

*Primary Examiner*—Glenn A. Auve
*Attorney, Agent, or Firm*—Blakely, Sokoloff, Taylor & Zafman LLP

[57] ABSTRACT

Memory bus extensions to a high speed peripheral bus are presented. Specifically, sideband signals are used to overlay advanced mechanisms for cache attribute mapping, cache consistency cycles, and dual processor support onto a high speed peripheral bus. In the case of cache attribute mapping, three cache memory attribute signals that have been supported in previous processors and caches are replaced by two cache attribute signals that maintain all the functionality of the three original signals. In the case of cache consistency cycles, advanced modes of operation are presented. These include support of fast writes, the discarding of write back data by a cache for full cache line writes, and read intervention that permits a cache to supply data in response to a memory read. In the case of dual processor support, several new signals and an associated protocol for support of dual processors are presented. Specific support falls into three areas: the extension of snooping to support multiple caches, the support of shared data between the two processors, and the provision of a processor and upgrade arbitration protocol that permits dual processors to share a single grant signal line.

16 Claims, 10 Drawing Sheets

METHOD AND APPARATUS FOR SHARING A SIGNAL LINE BETWEEN AGENTS

This is a divisional of application Ser. No. 08/420,494, filed Apr. 12 1995, U.S. Pat. No. 5,651,137.

BACKGROUND OF THE INVENTION

1. Field of the Invention

This invention relates to computer systems. More particularly, this invention relates to memory transactions within a dual processor computer system.

2. Art Background

The heart of a personal computer system is usually a central processing unit (CPU) that resides on a microprocessor chip. When a microprocessor operates at a high speed, computer instructions and data must be supplied to the microprocessor chip quickly if the speed of the microprocessor is to be utilized effectively. The bus that provides instructions for the microprocessor to execute, and that also provides the data that the microprocessor will use when executing these instructions, can become a bottle neck in a computer system having a fast microprocessor.

If the next instruction to be executed is not available when the microprocessor needs it, then the microprocessor must wait idly while the required instruction is retrieved and provided to the microprocessor. This idling also occurs when the microprocessor has the next instruction to be executed available, but the next instruction to be executed requires data that is not immediately available to the microprocessor. In order to decrease the frequency with which the microprocessor encounters these wait cycles, many modern high performance microprocessors have a small internal cache sometimes called a primary cache. Instructions that are likely to be executed, and data that is likely to be required by the executing instructions, are stored in the internal cache so that they can be accessed immediately by the CPU of the microprocessor.

When an instruction is to be executed or data is required, the cache is checked to determine whether a copy of the required instruction or data is immediately available within the cache. If a copy is stored within the cache (called a cache hit), then the copy can be supplied to the CPU immediately from the cache, and there is no need for the CPU to wait while the instruction or data is retrieved to the microprocessor chip from wherever it is stored within the computer system. On the other hand, if a copy is not stored within the cache (called a cache miss), then the CPU must wait while the instruction or data is retrieved to the microprocessor chip from wherever it is stored within the computer system.

When executing a program, the CPU may modify the copy of a line stored in the cache. In a write through caching scheme, the main memory is immediately updated when a cached copy has been modified. A write through caching scheme has the advantage that data in the cache is always consistent with data in main memory. This is especially advantageous in multiprocessor systems and in systems having direct memory access devices because the main memory always contains the most recent copy of the data. A disadvantage of the write through caching scheme is that it increases the traffic on the bus. This is because the bus is immediately used to send the modified data to the main memory so that the main memory can be updated every time that data in the cache is modified. This is particularly disadvantageous when a memory location is used to store temporary results that change frequently because the main memory must be updated each time the temporary result data changes.

By contrast, in a write back caching scheme, the main memory is not updated every time that a copy stored within the cache is modified. Instead, in a write back caching scheme, the copy stored within the cache may be modified several times before the main memory is updated. This has the advantage of reducing the traffic on the bus because the main memory is not updated as frequently. Furthermore, because the main memory update can be deferred, it is frequently possible to select a time when the bus is idle to update the main memory with the modified data. A disadvantage of the write back caching scheme is that the main memory can contain stale data. This happens when the data within the cache has been modified and the main memory has yet to be updated with the modified data. In multiprocessor systems, or systems having direct memory access devices, care must be taken to maintain cache coherency by ensuring that stale data within the main memory is not used by a co-processor or direct memory access device.

A cache consistency protocol is a set of rules by which states are assigned to cached entries (lines) in order to help maintain cache consistency. The rules apply for memory read and write cycles. Every line in a cache is assigned a state dependent on both processor generated activities and activities generated by other bus masters (e.g., snooping).

The MESI cache consistency protocol consists of four states that define whether a line is valid (i.e., hit or miss), whether it is available in other caches, and whether it has been modified. The four states are: M (Modified), E (Exclusive), S (Shared) and I (Invalid). A M-state line is available in only one cache and it is also modified (i.e., it is different from main memory). An E-state line is also available in only one cache in the system, but the line is not modified (i.e., it is the same as main memory). A write to an E-state line will cause the line to become modified. A line with a S-state indicates that the line is potentially shared with other caches (i.e., the same line may exist in more than one cache). A write to a shared line will generate a write through cycle. The write through cycle may invalidate this line in other caches. Finally, an I-state indicates that the line is not available in the cache. A read to this line will be a miss and may cause a line fill operation (i.e., a fetch of the whole line into the cache from main memory). A write to an invalid line will typically cause the processor to execute a write through cycle on the bus.

Inquire cycles, also called snoop cycles, are initiated by the system to determine if a line is present in a code or data cache, and, if the line is present, what state the line has. Inquire cycles are typically driven to a processor when a bus master other than the processor initiates a read or write bus cycle. Inquire cycles are driven to the processor when the bus master initiates a read to determine if the processor data cache contains the latest information. If the snooped line is in the processor data cache in the modified state, the processor has the most recent information and must schedule a write back of the data. Inquire cycles are driven to the processor when the other bus master initiates a write to determine if the processor code or data cache contains the snooped line and to invalidate the line if it is present.

It is also common to implement the main memory using DRAM, and then to supplement the DRAM based main memory with a SRAM based external cache memory (i.e., a second level cache memory that is external to the microprocessor chip). Because the external cache is not contained on the microprocessor chip, it can typically be made to store more data and instructions than can be stored by the internal cache. Because the external cache is not located on the microprocessor chip, however, it must supply the data and instructions to the microprocessor using one of the buses that often form bottlenecks for data and instructions entering and leaving the microprocessor chip.

A high speed microprocessor chip typically interfaces with the rest of the computer system using one or two high speed buses. The first of these buses is a relatively high speed asynchronous bus called a main memory bus. The second of these buses is a relatively high speed synchronous bus called a local bus. High bandwidth devices such as graphics adapter cards and fast input/output (I/O) devices can be coupled directly to the local bus. Each device coupled to the local bus, however, has an associated capacitive load. As the load on the local bus is increased, the maximum operating speed for the local bus decreases and the power required to drive the bus increases. Therefore, one device coupled to the local bus can be a peripheral bus bridge from the local bus to another bus called a high speed peripheral bus (e.g., a peripheral component interconnect (PCI) bus). The bus bridge isolates the load of the devices coupled to the high speed peripheral bus from the high speed local bus. Another device coupled to the local bus is typically an expansion bus bridge that couples the high performance local bus to a lower performance expansion bus. The low bandwidth components of the computer system are then coupled to the lower performance expansion bus.

The standard PCI specification is targeted to support the functions of an I/O bus. A high speed peripheral bus, such as the PCI bus, has adequate bandwidth to be used as a memory bus for low end systems (i.e., memory bus functionality can be overlaid onto the I/O bus functionality). The trend in mobile computers is towards smaller, faster, less expensive and lighter units. In entry level or mobile systems, part or all of the system memory may be coupled directly to the PCI bus. This may include read-only program modules as well as DRAM, both of which must be cacheable by the processor. The PCI cache support option provides a standard interface between PCI memory agent(s) and the bridge (or caching agent), that allows the use of an inquiry (snooping) cache coherency mechanism. This caching option assumes a flat address space (i.e., a single address has a unique destination regardless of access origin) and a single level bridge topology. This support option is optimized for simple, entry level systems, rather than for maximum processor-cache-memory performance. Thus, advanced mechanisms for cache consistency cycles, cache attribute mapping, and dual processor support are all beyond the scope of a high speed peripheral bus such as set forth in the standard PCI specification.

SUMMARY OF THE INVENTION

Memory bus extensions to a high speed peripheral bus are presented. Specifically, sideband signals are used to overlay advanced mechanisms for cache attribute mapping, cache consistency cycles, and dual processor support onto a high speed peripheral bus.

In the case of cache attribute mapping, three cache memory attribute signals that have been supported in previous processors and caches are replaced by two cache attribute signals that maintain all the functionality of the three original signals.

In the case of cache consistency cycles, advanced modes of operation are presented. These include support of fast writes, the discarding of write back data by a cache for full cache line writes, and read intervention that permits a cache to supply data in response to a memory read.

In the case of dual processor support, several new signals and an associated protocol for support of dual processors are presented. Specific support falls into three areas: the extension of snooping to support multiple caches, the support of shared data between the two processors, and the provision of a processor and upgrade arbitration protocol that permits dual processors to share a single grant signal line.

Other objects, features, and advantages of the present invention will be apparent from the accompanying drawings and from the detailed description which follows below.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

In the following description, for purposes of explanation, specific numbers, materials and configurations are set forth in order to provide a thorough understanding of the present invention. It will be apparent to one skilled in the art, however, that the present invention may be practiced without these specific details. In other instances, well known systems are shown in diagrammatic or block diagram form in order not to obscure the present invention unnecessarily.

Figure 1:
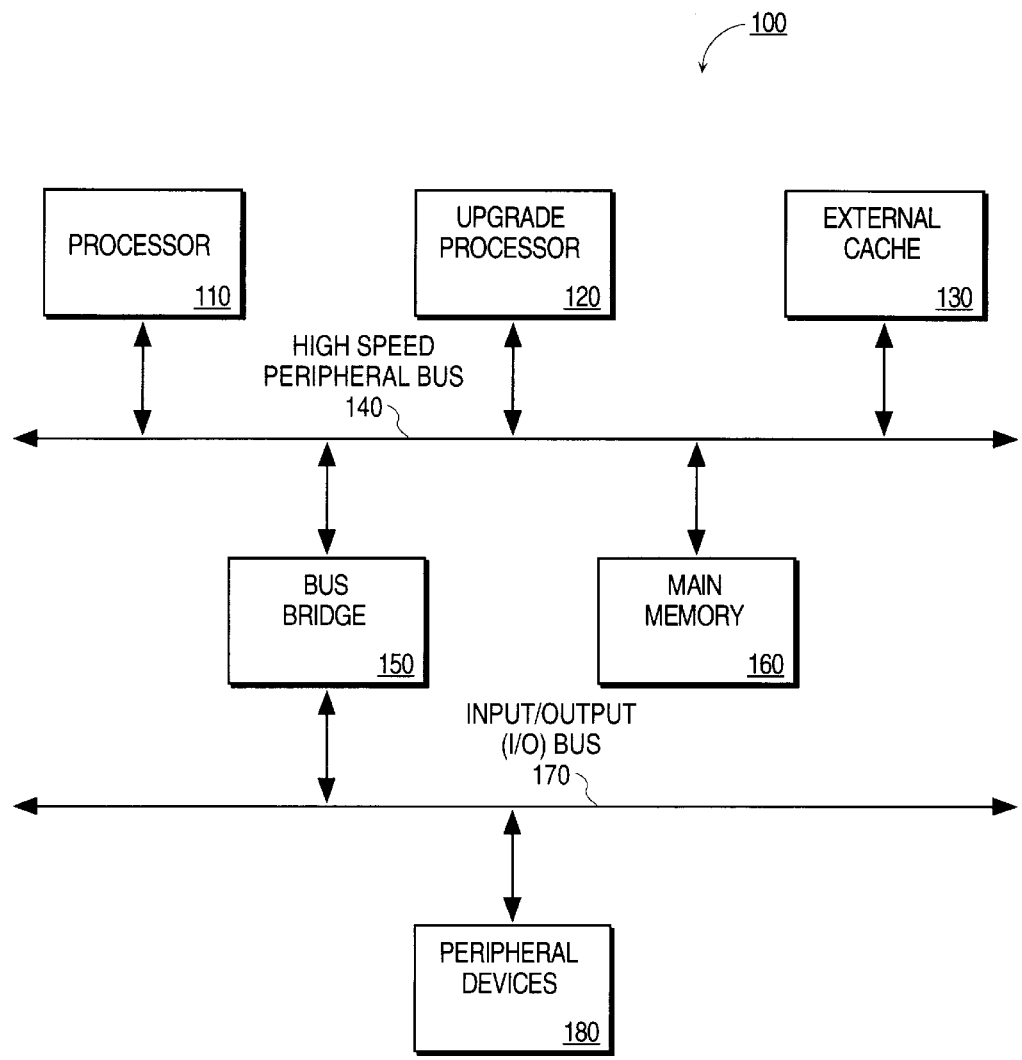
FIG. 1 illustrates a computer system wherein a processor is supplemented by an upgrade processor and wherein processor traffic is routed to a high speed peripheral bus.

FIG. 1 illustrates a block diagram of a multi-processor computer system 100, wherein processor 110 has been supplemented by addition of upgrade processor 120. In computer system 100, processor 110 is coupled by high speed peripheral bus 140 to upgrade processor 120, external cache 130, bus bridge 150 and main memory 160. Bus bridge 150, in turn, is coupled by input/output (I/O) bus 170 to one or more peripheral devices 180. Input/output bus 170 is representative of a class of relatively slow buses usually used for low bandwidth communications. Examples of input/output bus 170 would include buses adhering to the industry standard architecture (ISA), extended industry standard architecture (EISA) or micro channel architecture (MCA) bus standards. High speed peripheral bus 140, on the other hand, is a high speed input/output bus upon which advanced memory bus operations have been overlaid, the details of which will be set forth below. In the case of the system of FIG. 1, high speed peripheral bus 140 has been enhanced in order to reduce the cost and complexity of system 100 by eliminating the need to provide a separate memory bus within the system. Thus, computer system 100 is an example of a low end system where central processor unit (CPU) traffic is routed directly to an enhanced high speed peripheral bus. Because of the limited bus bandwidth of bus 140, upgrade processor 120 is a turbo upgrade.

For one embodiment, high speed peripheral bus 140 is a peripheral component interconnect (PCI) bus as defined by the PCI standard, rev. 2.0 that has been augmented so as to provide enhanced memory capabilities. To provide a consistent example, the following description will describe modifications that can be made to overlay advanced memory bus operations upon the PCI standard bus. It is to be understood, however, that the techniques set forth herein are not limited solely to application to the PCI bus. Instead, high speed peripheral bus 140 is representative of a class of high speed input/output buses to which advanced memory capabilities can be provided.

Figure 2:
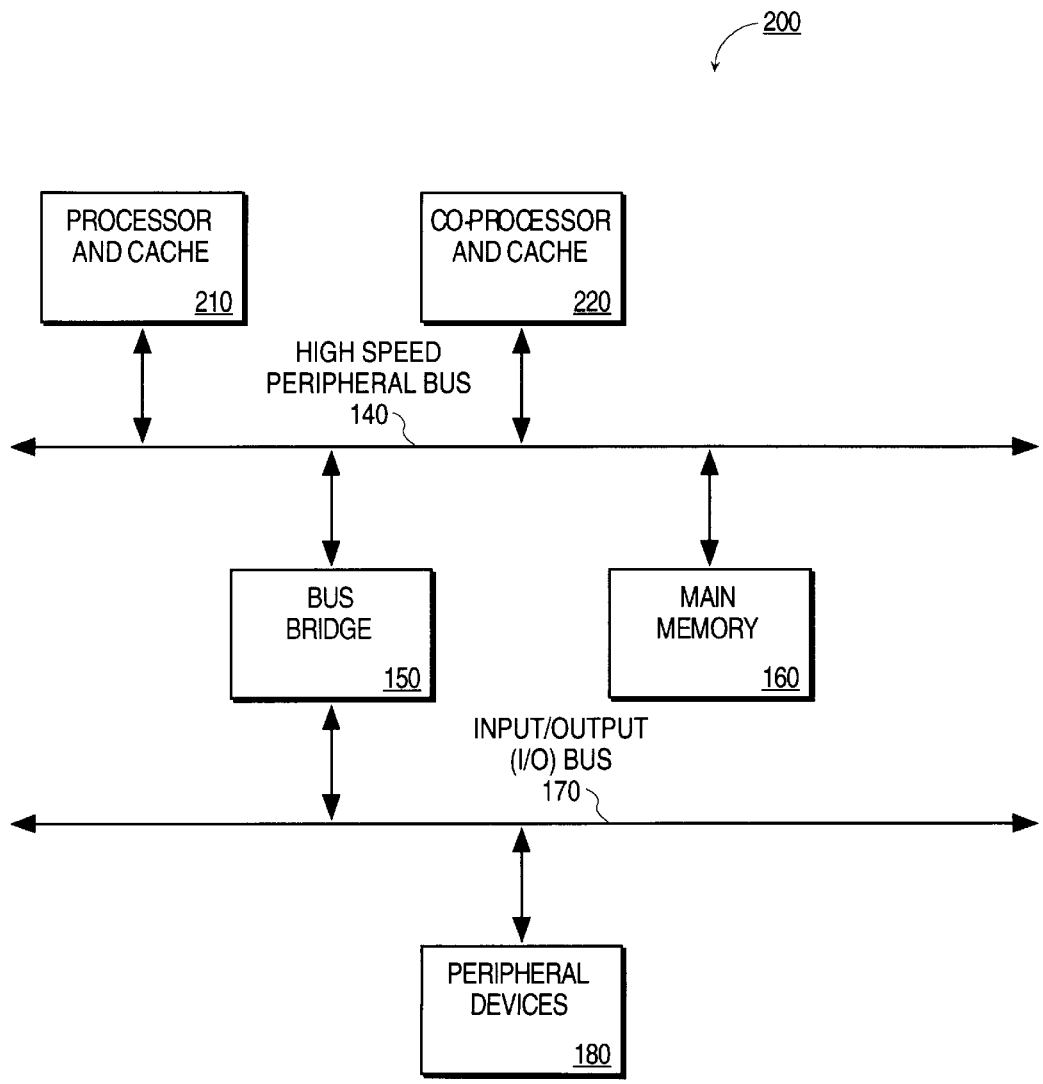
FIG. 2 illustrates a computer system wherein a processor is supplemented by a co-processor and wherein processor traffic is filtered by a cache complex before being routed to a high speed peripheral bus.

It is to be further understood that the architecture of computer system 100 is merely representative of a wide class of computer system architectures in which the present invention can be practiced. For example, FIG. 2 illustrates a block diagram of an alternate architecture multi-processor computer system 200 that can benefit by providing advanced memory bus operational capability to a high speed peripheral bus 140.

In system 200, processor and cache complex 210 has been supplemented by addition of co-processor and cache complex 220. In computer system 200, processor and cache complex 210 is coupled by high speed peripheral bus 140 to co-processor and cache complex 220, bus bridge 150 and main memory 160. Bus bridge 150, in turn, is coupled by input/output bus 170 to one or more peripheral devices 180. In contrast to system 100 of FIG. 1, system 200 of FIG. 2 is a higher-end system wherein CPU traffic is filtered by a cache complex (i.e., a front side or back side second level cache), before being routed to high speed peripheral bus 140. In system 200, the filtering effect of the second level cache on bus 140 traffic permits bus 140 to support a dual processor multi-processor type (MP-type) of system. Alternately, in system 200, the filtering effect of the second level cache on bus 140 traffic permits bus 140 to support an application accelerator type (A-type) of system.

With the exception of the functionality provided to overlay the advanced memory bus operational capability onto high speed peripheral bus 140, computer system 100 of FIG. 1 and its constituent components operate in a manner that is well known in the art. Furthermore, with the exception of the functionality provided to overlay the advanced memory bus operational capability onto high speed peripheral bus 140, computer system 200 of FIG. 2 and its constituent components operate in a manner that is well known in the art. Therefore, the operation of computer systems 100 and 200 and their constituent components will not be discussed further except to describe how the operation of the components of computer systems 100 and 200 affect the functionality provided to overlay advanced memory bus operational capability onto high speed peripheral bus 140.

The Peripheral Component Interconnect (PCI) is a physical interconnect mechanism intended for use between highly integrated peripheral controller components and processor-memory systems. The PCI design was developed to have a system architecture that uses a CPU-PCI bridge component to decouple the system I/O core design from the processor-memory treadmill, thus allowing the design to survive multiple generations of processor-memory technology.

For a low cost system, however, it can make economical sense to interface the CPU directly to the PCI bus (i.e., to provide an integrated CPU-PCI bridge). It is also possible to further decouple the processor-memory treadmill using larger or more efficient first level or second level caches, thereby allowing a PCI bus to directly support future processor generations.

The following describes memory bus extensions to the PCI bus for a range of CPU and second level cache combinations. In addition, the following describes other system signals that can be used to support these upgrade and dual processor implementations.

The memory bus extension to the PCI bus will efficiently support the two configurations shown in FIGS. 1 and 2. In fact, for one embodiment, a chipset defined to support the memory bus extension will logically work with any one of the two configurations. For the upgrade and dual processor strategy, other system signals, such as FLUSH, INIT (described below) are also defined such that they are compatible across all configurations.

The PCI bus specification explicitly allows one snooping device and one caching device on the bus. The memory extension to the PCI described herein extends this to support up to two snooping devices (i.e., a dual processor MP or an A-type processor) on the memory bus.

The following description assumes that the reader is familiar with the PCI bus specification and therefore standard PCI signals and protocol will only be described briefly herein. Hence, the emphasis of the following discussion will be upon additional signals and protocol needed to extend the PCI bus, or another type of high speed peripheral bus, into an execution bus. The following discussion is organized into the sections: Cache Attributes, Bus Cycle Definition, Upgrade Processor Support, Snoop Protocol, System Signals and System Error Model.

CACHE ATTRIBUTES

The cache attribute functions are provided by the target of an access. They are: Cache Enable, Write Back/Write Through and Write Protection. The Cache Enable attribute allows the current bus transaction to be defined as cacheable or non-cacheable. The information is consequently used to determine cycle length.

For one embodiment, the memory bus extensions defined herein support the MESI cache coherency protocol or any proper subset of the MESI protocol. The Write Back/Write Through attribute allows a cache line to be defined as a write back or write through cache line. Thus, this attribute determines whether a cache line is initially in the S or E state in a MESI cache. If the attribute is a write through, the cache line is always saved, or remains, in the Shared (S) state.

The Write Protection attribute allows a cache line to be defined as being write protected. If the CPU writes to a write protected cache line, the write data will bypass the cache and be written out to the external bus.

For one embodiment, the three cache attribute functions, Cache Enable, Write Back/Write Through and Write Protection, are encoded in the following two signals: KEN# and WBT. Signals hereafter will be generally referred to by signal names. Particular signal names may be varied without departure from the scope and spirit of the present invention. Further, signal states will be referred to as being active or inactive, high or low, one or zero, true or false, asserted or deasserted, etc. Signals which are active when low are indicated by a suffix of "#"; i.e. XXX#. As examples of these signal naming conventions, see Table 1 below:

TABLE 1

| SIGNAL NAMES | ELECTRICAL NOTATION | LOGICAL NOTATION | STATE |
|---|---|---|---|
| WBT | High | 1 or true | Active |
| | Low | 0 or false | Inactive |
| KEN# | Low | 1 or true | Active |
| | High | 0 or false | Inactive |

Furthermore, a decimal radix convention will be used when describing groups of signals. For example, AD(15:0) will refer to all 16 signals of signal group AD. Within each group, the least significant bit of the group is referred to with a suffix of "0." In other words, AD0 will refer to the least significant bit of the group and AD15 will refer to the most significant bit.

KEN# and WBT are used during a data phase of an access to indicate the cacheability of the access. For one embodiment, the default attribute for the access is non-cacheable (i.e., high for KEN# and WBT). For this embodiment, when combined together, KEN# and WBT have the following encoded attributes:

| KEN# | WBT | Attributes |
|---|---|---|
| H | H | Non-Cacheable |
| L | H | Cacheable, write-back |
| L | L | Cacheable, write-through |
| H | L | Cacheable, write protect |

For alternate embodiments wherein only a subset of the cache attributes is to be supported, some of the signal pins can be "strapped". For example, for write through cache support, the WBT and KEN# pins can be tied together. Similarly, for a write back cache with no write protection or write through support required, the WBT# pin can be strapped always high.

Figure 3:
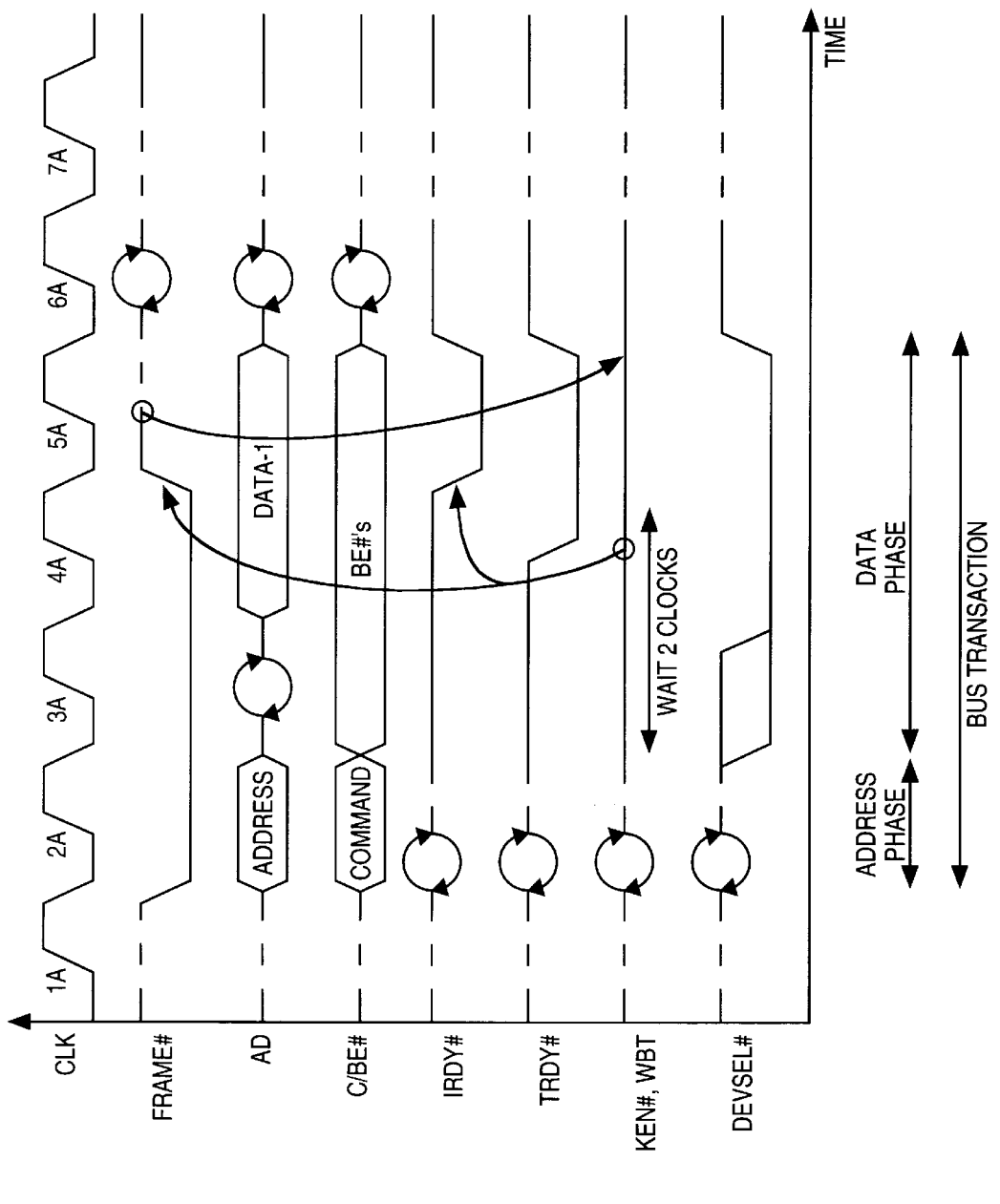
FIG. 3 illustrates a non-cacheable single word read access wherein default cache attributes are assumed.

FIG. 3 is a timing diagram that illustrates the use of the KEN# and WBT signals in a non-cacheable single read access. Timing diagrams show the relationship of significant signals involved in transactions. When a signal is drawn as a solid line, it is actively being driven by the current master or target. When a signal is drawn as a dashed line, no agent is actively driving it. The signal may still be assumed to contain a stable value, however, if the dashed line is at the high rail. Tri-stated signals are indicated to have indeterminate values when the dashed line is between the two rails (e.g., AD or C/BE# lines). When a solid line becomes a dotted line, it indicates that the signal was actively driven and now is tri-stated. When a solid line makes a low to high transition and then becomes a dotted line, it indicates the signal was actively driven high to precharge the bus, and then tri-stated. A turn-around cycle is performed on all signals that may be performed by more than one agent. The turn-around cycle is used to avoid contention when one agent stops driving a signal and another begins. This is indicated on the timing diagrams as two arrows pointing at each other's tail.

The PCI standard permits PCI signals to be supplemented by non PCI signals called sideband signals. A sideband signal is loosely defined as any signal not part of the PCI specification that connects two or more PCI compliant agents, and that has meaning only to those agents that it connects. The PCI specification dictates that sideband signals may never violate the specified protocol for defined PCI signals or cause the specified protocol to be violated. KEN# and WBT are examples of sideband signals. In addition to KEN# and WBT, several standard PCI signals are depicted in FIG. 3. The PCI pin definitions are organized into the functional pin groups: System, Address and Data, Interface Control, Arbitration (Bus Masters only), Error Reporting, Interrupt (Optional), Cache Support (Optional), 64-bit Bus Extension (Optional), and JTAG/Boundary Scan (Optional). Pertinent pins from the System, Address and Data and Interface Control functional pin groups are depicted beginning with FIG. 3 (with the exception of the interface control pin STOP#, which will not be discussed until FIG. 10). Pertinent pins from the Arbitration and Cache Support functional pin groups are depicted beginning with FIG. 5.

One signal shown in FIG. 3 is the signal at the PCI bus CLK (clock) pin. CLK is defined by the PCI standard to be a standard input-only signal. CLK provides timing for all transactions on PCI and is an input to every PCI device. According to the PCI standard, with the exception of the PCI reset signal (RST#) and the four PCI interrupt signals (INTA#, INTB#, INTC# and INTD#), all other PCI signals are sampled on the rising edge of CLK and all other timing parameters are defined with respect to this edge. Thus, in FIG. 3, six clock cycles are shown with each of the cycles beginning at one of the rising edges 1A through 6A, respectively, and ending on the next successive rising clock edge. The PCI standard permits a PCI bus to operate at a clock frequency of up to 66 MHz and, in general, the minimum PCI bus clock frequency is DC (0 Hz).

Also shown in FIG. 3 are the signals at the PCI Address and Data pins, AD and C/BE#, and the signals at the PCI interface control pins, FRAME#, IRDY#, TRDY# and DEVSEL#. The AD and C/BE# signals are tri state (t/s) signals. A Tri state signal is a bi-directional tri-state input output pin. Each of the PCI interface control signals shown in FIG. 3, however, are sustained tri state (s/t/s) signals. According to the PCI protocol, a Sustained tri state signal is an active low tri state signal owned and driven by one and only one agent at a time. The agent that drives an s/t/s pin low must drive it high for at least one clock before letting it float. A new agent cannot start driving a s/t/s signal any sooner than one clock after the previous owner tri-states it. A pull-up is required to sustain the inactive state until another agent drives it, and must be provided by the central resource.

According to the PCI standard, Addresses and Data are multiplexed on the same pins, AD(31:0). A bus transaction consists of an address phase followed by one or more data phases. The PCI address phase is the clock cycle in which the interface control signal FRAME# is asserted. Thus, in FIG. 3, the address phase starts on clock 1A and ends on clock 2A. During the address phase, AD(31:00) contain a physical address (32 bits). For I/O this is a byte address; for configuration and memory it is a DWORD address. During data phases, AD(07:00) contain the least significant byte (lsb) and AD(31:24) contain the most significant byte (msb). Write data is stable and valid when the interface control signal IRDY# is asserted and read data is stable and valid when the interface control signal TRDY# is asserted. Data is only transferred during clocks w herein both IRDY# and TRDY# are asserted. PCI supports both read and write bursts. In FIG. 3, however, there is only a single data phase. The data phase of FIG. 3 begins on clock 2A and ends on clock 5A. Clocks 3A and 4A insert wait states in the data phase.

Similarly, bus commands and byte enables are multiplexed on the PCI C/BE# pins. During the address phase of a transaction, C/BE#(3:0) define a bus command. During the data phase C/BE#(3:0) are used as Byte Enables. The Byte enables are valid for the entire data phase and determine which byte lanes carry meaningful data. C/BE#0 applies to byte 0 (lsb) and C/BE#3 applies to byte 3 (msb).

The PCI interface control signal FRAME # (Cycle frame) is driven by the current master to indicate the beginning and duration of an access. FRAME# is asserted to indicate a bus transaction is beginning. While FRAME # is asserted, data transfers continue. When FRAME # is deasserted, the transaction is in the final data phase. Thus, in FIG. 3, FRAME# is asserted at the beginning of the address phase at time 2A and FRAME# is deasserted at time 5A during the sole, and hence final, data phase.

The interface control signal IRDY# (Initiator ready) indicates the ability of the initiating agent (i.e., the bus master) to complete the current data phase of the transaction. IRDY# is used in conjunction with the interface control signal TRDY# (Target ready). Signal TRDY# indicates ability of the target agent (i.e., the selected device) to complete the current data phase of the transaction. A data phase is completed on any clock that IRDY# and TRDY# are both sampled asserted. During a write, IRDY# indicates that valid data is present on AD(31:00) and TRDY# indicates the target is prepared to accept data. During a read, TRDY# indicates that valid data is present on AD(31::00) and IRDY# indicates that the master is prepared to accept data. Wait cycles are inserted until both IRDY# and TRDY# are asserted together.

When actively driven, the interface control signal DEVSEL# (Device select) indicates that the driving device has decoded its address as the target of the current access. As an input, DEVSEL# indicates whether any device on the bus has been selected. In FIG. 3, DEVSEL# indicates on clock 2A or 3A that the target has decoded the address of the address phase as being intended for it. The target then holds DEVSEL# low until clock 6A when the transaction has completed.

Figure 4:
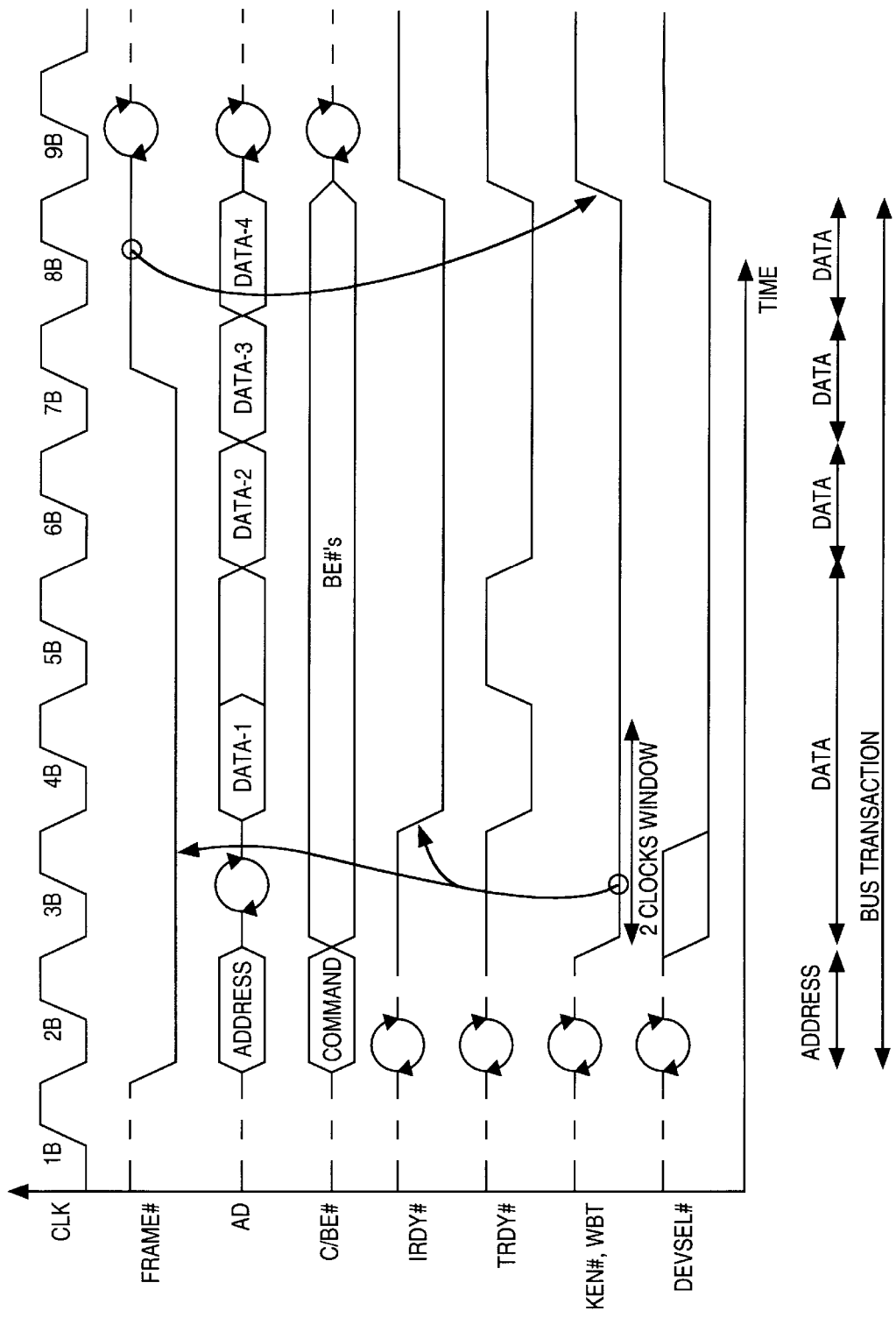
FIG. 4 illustrates a cacheable access wherein the target specifies cache attributes.

For one embodiment shown in FIGS. 3 and 4, each cache attribute takes on its default value if neither one of the KEN# and WBT signals is asserted low within a two clock window after the first clock FRAME# is asserted active. KEN# and WBT will be sampled as valid on the clock in which either one of the signals is asserted low during the two clock window (FIG. 4), or at the end of the window, if neither is asserted during the two clock window (FIG. 3).

FIG. 3 illustrates a memory read line transaction wherein a CPU initiates a cache line read. In FIG. 3, the memory read line transaction starts on Clock 2A with an address phase that occurs when FRAME# is asserted for the first time. A cacheable central resource device has a two clock window ending at clock 4A to decode the address and assert KEN# and WBT accordingly to indicate a cacheable access. In FIG. 3, KEN# and WBT remain high during the two clock window. Therefore, because the CPU has not been informed by clock 4A (the end of the two clock window) that the access is cacheable, the CPU then deasserts FRAME# to indicate a single word transfer.

As shown in FIG. 3, for a single data phase transfer, FRAME# is deasserted at the same time that IRDY# is asserted. For a multiple data phase transfer such as that of FIG. 4, the CPU will deassert FRAME# when starting the last data phase (this requires that IRDY# is asserted). For read transactions wherein whether or not the transaction is a multi-data phase transaction is conditioned upon the line being read being cacheable, IRDY# must be held back as shown in FIG. 4 until the cache attributes are valid.

FIG. 4 illustrates a cacheable memory read line transaction. In FIG. 4 the transaction starts on clock 2B with an address phase that occurs when FRAME# is asserted for the first time. The target then decodes the address and determines that the cache line is cacheable. Therefore, on clock 3B, the target asserts KEN# and/or WBT accordingly. On sampling KEN# or WBT active during the 2 clock window, the CPU then proceeds to complete the memory read line operation (i. e., the cache line read).

BUS CYCLE DEFINITION

In this section, bus cycles relating to CPU access cycles are defined. Their definitions and rules are described in four sub-sections: command mapping, multidata phase cycle requirements, special cycle mapping and configuration space mapping.

Command Mapping

This sub-section specifies how CPU bus commands map into the PCI bus commands. The possible number of DWORD transfers that the CPU will attempt to burst in the transaction is also presented. Because PCI supports transfers of variable length, there is no requirement herein regarding how long a memory read or memory write can be. Thus, for example, a memory write of three transfers (for possible write packetizing, etc.) is not precluded.

A PCI Memory Read Line command (signified by a C/BE(3:0) value of 1110) maps to a CPU intended cacheable code or data read access. The KEN# and WBT cache attributes are used to qualify the PCI memory read line command. Thus, the possible number of transfers that the CPU will attempt to burst in the transaction will be 1, 2 or 4 when KEN# is inactive and WBT is active. Otherwise, the number of transfers that the CPU will attempt to burst will be 4 or 8. For all other command mappings the KEN and WBT signals do not modify the PCI command.

A PCI Memory Write and Invalidate command is signified by a C/BE(3:0) value of 1111 and maps to a CPU intended access of a cache line transfer for a write back cycle. The number of transfers that the CPU will attempt to burst will be 4 or 8.

The PCI commands Interrupt acknowledge, Special Cycle, I/0 read and I/O write (having C/BE(3:0) values of 0000, 0001, 0010 and 0011, respectively) will map to similarly named CPU intended accesses. In each case the CPU will only attempt a single transfer.

The PCI memory read command type (C/BE of 0100) maps to a non-cacheable code or data read CPU access and the CPU will attempt to burst transfer 1, 2 or 4 DWORDs. Similarly, the PCI memory write command type (C/BE of 0111) maps to a non-cacheable cache write CPU access and the CPU will attempt to burst transfer 1 or 2 DWORDs.

The PCI configuration read command type (C/BE of 1010) maps to a 32 bit I/O read CPU access to hex address 0CFC. Similarly, the PCI configuration write command type (C/BE of 1011) maps to a 32 bit I/O write CPU access to hex address 0CFC. In each case the CPU will only attempt one transfer.

Multi-Data Phase Cycle Requirements

In the case of a read cycle, the PCI protocol allows the master or the target to abort during a transaction. For a 64 bit aligned read transaction (this corresponds to PLOCK bus cycle in the standard i486 bus), the target and the CPU is required to guarantee an atomic transaction. The CPU will assert IRDY# in the first clock after the address phase for an atomic 64 bit aligned read transaction. The target may then use this to complete the transaction in an atomic fashion.

Once KEN# and WBT are asserted to indicate a cacheable read access, the target cannot abort the transaction. For a target to abort on such access is a protocol error. In such a case the bus master will assert the PCI system error signal, SERR#. In the case of a CPU, the CPU also has the option of vectoring to an internal fault handling routine.

In the case of a write cycle, the PCI protocol allows the master or the target to abort during a transaction. For cache line write back and aligned 64 bit write transactions, the target and the CPU should guarantee atomic transaction. This is accomplished by establishing locks on PCI with a read. Here, CPU cache line write back cycle is mapped to the Memory Write and Invalidate command of the PCI bus. Similarly, the CPU 64 bit write cycle is mapped to the memory write cycle of the PCI bus. A 64 bit write transfer is indicated in the PCI protocol by keeping FRAME# asserted during the first IRDY# assertion. The target may then use this to complete the transaction in an atomic fashion.

Most of the targets on the PCI bus will handle a linear mode encoded transaction more efficiently than a cacheline wrap. Therefore, a bus master should use a linear mode encoded transaction whenever possible.

Special Cycle Mapping

A CPU will generate single special cycles with one data phase only. In the PCI specification, a special cycle message is encoded in a 32 bit data word. The lower 16 bits of the data word are the message number, allowing for up to 64K different message types. The upper 16 bits of the data word can be used to hold message specific information. The message number can be programmable. The PCI specification has included Halt and Shutdown special cycles generated by a CPU. The PCI protocol also defines special cycles that can be used for sideband signal wire replacement. The following are additional special cycles not set forth in the PCI specification that can also be generated by a CPU.

Three special cycles, Cache_Flush, Cache_WB and Flush_Ack, concern caching of an internal processor cache. Assertion of the processor FLUSH# pin causes an on-chip processor cache to be invalidated. The INVD and WBINVD processor instructions also cause an on-chip processor cache to be invalidated. WBINVD causes the modified lines in the internal data cache to be written back, and all lines in both caches to be marked invalid. The Cache_Flush (flush) special cycle is driven after the INVD or WBINVD instructions are executed. It is used to indicate to the external system that the internal caches were invalidated and that external caches should also be invalidated. The Cache_WB (write back) special cycle is driven after the WBINVD instruction is executed. It indicates that modified lines in the data cache were written back. When the FLUSH# pin is asserted, all modified lines in a write back cache are written back and then all lines in the cache(s) are invalidated. The Flush_Ack (flush acknowledge) special cycle is driven after the write back and invalidation have been completed.

Additionally the Br_trace (branch trace) special cycle allows external tracking of branch occurrences. Here the address phase of the special cycle is used to carry a 32 bit branch-target address.

Finally, the ICE (in circuit emulation) special cycle provides ICE support for a PCI based CPU-cache subsystem. The ICE special cycle is defined as a handshake between the CPU and the ICE only. An additional sideband signal can then be used to permit transactions between the CPU and the ICE.

Configuration Space Mappling

The PCI specification defines how software generates configuration cycles and how software generates PCI special cycle transactions on the PCI bus. The PCI specification also requires a configuration register space in each PCI compliant device. Thus, a PCI compliant processors must implement specific configuration registers in order for a processor connected directly to the PCI bus to deal with the PCI configuration space.

A PCI processor can be viewed as containing two functions: the processor core and a bridge to PCI. The core provides support for identification mechanisms supported by standard processors. The bridge, on the other hand, provides support for the PCI configuration space. The core and bridge identification mechanisms do not need to track each other. Thus, for example, the core version may change while the bridge version number remains unchanged. Integrated bridges can be hardwired to respond as device 0 on bus 0.

For one embodiment, the configuration space of the bridge portion does not need to be readable by any agent except the contained processor core. Alternately, the configuration space of the bridge portion can be read by other agents. Whether or not the configuration space of the bridge system need be readable by agents other than the contained processor core is a design decision that depends upon the necessary level of implementation complexity. In a multi-processor implementation, however, another mechanism, possibly software based, may be provided to detect and identify the number and types of processors within the system.

For one embodiment, the configuration registers that are implemented by the bridge portion include: Vendor ID, Device ID, Command, Status, Revision ID, Class Code, Cache line Size and Latency Timer. All other registers are then read-only and return zero values when they are read. The Vendor ID and Device ID fields can both be implemented as read only registers, with the former identifying the vendor providing the part and the latter identifying the specific device provided by the vendor. In the case of the Command field, Bits 6 (i.e., Parity Enable) and 8 (i.e., SERR# Enable) will typically be implemented as being writable. Depending upon the capability of a particular processor, other bits of the Command field may also be writable. Similarly, all defined bits (except bits 9, 10 and 11) should be writable. If appropriate, the Cache Line Size field should be implemented, in which case the field will probably be a read only field. The Class Code field should be implemented with the encoding for a host bridge (i.e., 060000h). The Revision ID field need only be implemented as needed.

UPGRADE SUPPORT

There are three types of processor upgrades. They are turbo upgrade, dual processor (DP) upgrade and application processor (AP) upgrade. Considerations for the application processor upgrade are very similar to considerations for the dual processor upgrade. Hence, there will be a turbo processor upgrade discussion and a dual-application processor upgrade discussion only.

In the case of a turbo upgrade, the original processor-cache pair are provided with an UP# (Upgrade Present) input pin and the upgrade processor-cache pair are provided with an UP# output pin. The UP# output pin of the upgrade processor is connected directly to the UP# input pin of the original processor-cache pair that is to be upgraded. When the Upgrade Processor occupies the Upgrade Socket, the UP# signal (active low) forces the original processor to tri-state all outputs and reduce power consumption. When the upgrade processor is not in the Upgrade Socket, a pull up resistor, internal to the original processor, drives UP# inactive and allows the original processor to control the processor bus.

The dual-application processor upgrade case is more complex than the case of a turbo upgrade because of limitations set forth within the PCI specification. The PCI specification provides for an arbitration mechanism between bus masters. Each bus master communicates with the arbitration mechanism using the point-to-point bus master signals REQ# and GNT#, with every master having its own REQ# and GNT# signal. REQ# (Request) indicates to the arbiter that the agent desires use of the bus. GNT# (Grant) indicates to the agent that access to the bus by the agent has been granted.

The PCI specification also provides for limited cache support through the PCI input/output pins SDONE and SBO#. SDONE (Snoop done) indicates the status of a snoop for a current access. When deasserted, SDONE indicates that the result of the snoop is still pending. When asserted, SDONE indicates that the snoop is complete. SBO# (Snoop Backoff), on the other hand, indicates a hit to a modified line when asserted. Thus, when SBO# is deasserted and SDONE is asserted it indicates a CLEAN snoop result. A cacheable PCI memory should implement both cache support pins as inputs, to allow the memory to work with either write through or write back caches. Thus, if cacheable memory is located on PCI, a bridge connecting a write back cache to PCI must implement both pins as outputs. A bridge connecting a write through cache, however, need only implement one pin, SDONE.

The PCI specification does not directly support dual processors, however. Therefore the PCI specification does not provide the appropriate signals to allow the interaction between dual processors that is required when dual processors are present within a system. The PCI specification can be extended to support dual processors by providing a dual cache mode wherein the original processor is required to drive SDONE and the upgrade (or second) processor is only permitted to monitor SDONE. Both processor, however, are allowed to drive SBO# in this mode. In this case, rather than being a standard input/output signal, SBO# is modified to become an s/t/s signal. Thus, because SBO# is a s/t/s signal, the agent that asserts SBO# is required to restore it to the deasserted state before tri-stating it.

Figure 5:
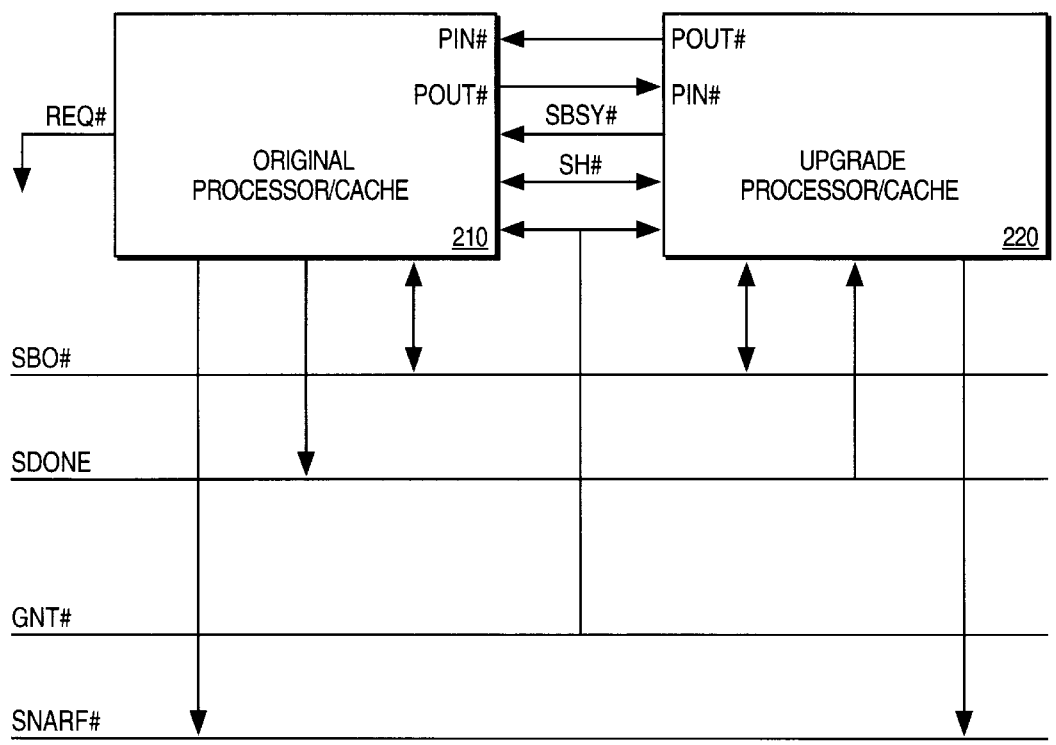
FIG. 5 illustrates coupling between an original processor and an upgrade processor.

To insure proper operation of the two caches and the PCI protocol, arbitration and snoop support sideband signals are also added. The arbitration support signals PIN# and POUT# are shown in FIG. 5. Examples illustrating their operation will be presented in connection with FIGS. 6 and 7. The PIN# and POUT# signals support arbitration between an original processor and an upgrade processor. The snooping support signals: SBSY# (snoop busy), SH# (share) and SNARF# are also shown in FIG. 5. Examples illustrating their operation will be presented in connection with FIGS. 8, 9 and 10. SBSY# allows the original processor and the upgrade processor to have different and/or varying snoop windows. SH# allows a MESI cache to enter the shared state. SNARF#, discussed in conjunction with FIG. 10, allows a read intervention to occur when there is a snoop hit thereby reducing overhead on the bus.

As shown in FIG. 5, the upgrade processor does not have a REQ# signal. For one embodiment, the arbiter will grant the original processor access whenever the bus is idle and no other requests are pending. Thus, the REQ# signal of the original processor is not required to be connected to the arbiter, thereby providing a savings of one pin on the arbiter. Alternately, the original processor has a REQ# signal to the PCI bus arbiter with which the original processor indicates to the arbiter that the original processor desires use of the bus. In the latter case, the original processor is also responsible for asserting its REQ# signal on behalf of the upgrade processor. In either case, however, the original processor shares its GNT# with the upgrade processor. An "owner" is defined as the processor who owns, or will own, the PCI bus when the GNT# line is asserted by the arbiter. The two processors arbitrate amongst themselves using pins PIN# and POUT#.

PIN# (Processor IN) is an input signal and is always an input to the processor regardless of whether the processor is an original or upgrade processor. PIN# has one meaning when the processor to which it is input is the owner and another meaning when the processor to which it is input is not the owner. When a processor is the owner of the PCI bus, its PIN# is a request line from the other processor indicating that the other processor requires access to the bus. When a processor is not the owner of the PCI bus, its PIN# is a grant line from the owner of the bus (i.e., from the other processor). PIN# of the original processor can be pulled high internally so as to disable the dual processor arbitration function when a second processor is not present within a system.

POUT# (Processor OUT) is an output signal and is always an output from the processor regardless of whether the processor is an original or upgrade processor. As was the case with PIN#, POUT# has one meaning when the processor from which it is output is the owner and another meaning when the processor from which it is output is not the owner. When a processor is the owner of the PCI bus, its POUT# is a grant line to the other processor indicating that it has been granted access to the bus. When a processor is not the owner of the PCI bus, its POUT# is a request line to the owner of the bus (i.e., to the other processor).

For one embodiment, after system reset, the owner is the original processor. Whenever the owner is to start an access, the owner follows the normal PCI protocol (i.e., once FRAME# and IRDY# are deasserted and GNT# is asserted, the owner may start a transaction). When a processor is not the owner, the processor asserts its POUT# signal to indicate to the owner processor that the processor that is not the owner requires use of the bus. When PIN# of the processor that is not the owner is asserted by the owner processor, the owner has granted the other processor access to the bus. The processor that requested the bus then becomes the new bus owner and the normal PCI protocol is followed (see FIG. 6).

Figure 7:
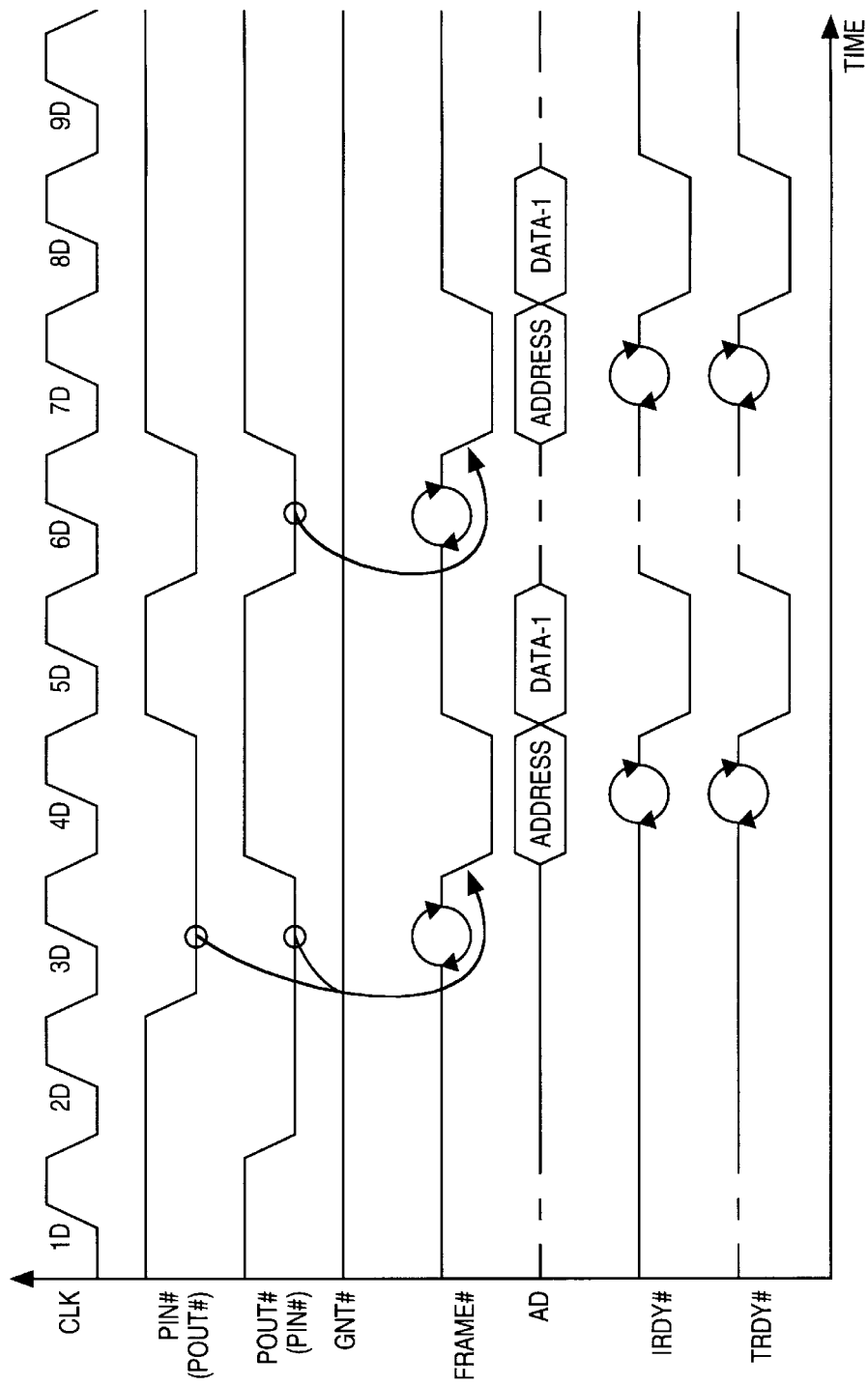
FIG. 7 illustrates co-processor arbitration with a bus grant offered by a bus owner.

To reduce arbitration latency, a bus owner can also offer bus ownership to the other processor. The original bus owner can withdraw its ownership at any time, however, so as long as the other processor has not yet successfully claimed ownership (i.e., POUT# is not asserted by the other processor and sampled active at the same time as PIN# is sampled active, as shown in FIG. 7).

In summary, the ownership of the bus changes whenever the PIN# and POUT# are sampled active at the same time.

In a system wherein both processors require use of the bus continually, their PIN# and POUT# signals are asserted continuously. Ownership will change every time PIN# and POUT# is sampled active at the same time. POUT# of the owner is used to signal grant to the other processor. When ownership changes, the same POUT# used to signal the grant of ownership becomes a request to the owner for use of the bus and PIN# becomes the grant to the requester.

Figure 6:
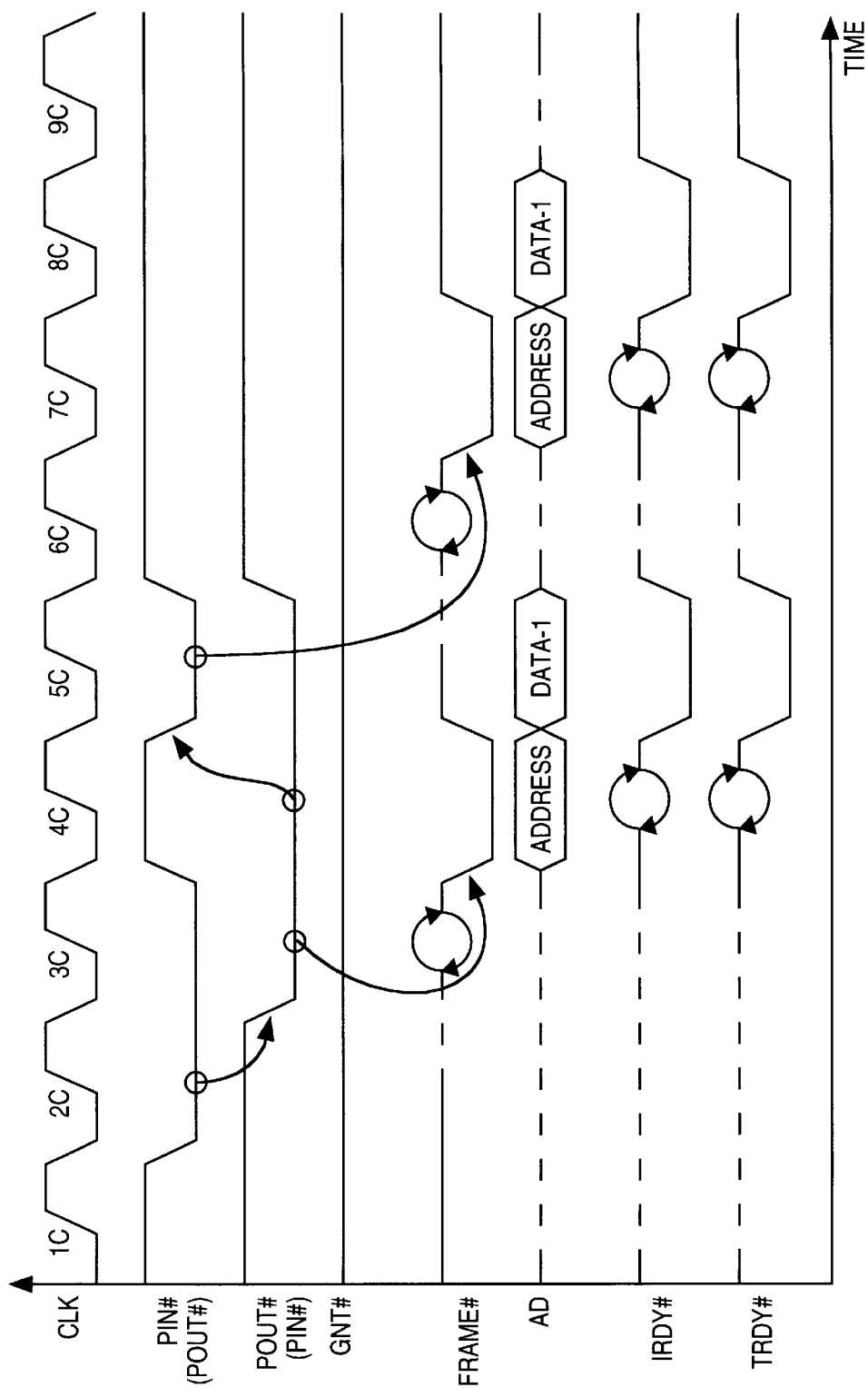
FIG. 6 illustrates co-processor arbitration for a bus request from a non-bus owner.

FIG. 6 illustrates the handshaking between an original processor and a second processor (i.e., a dual or application processor). As described earlier, after reset, the original processor is the owner and determines when the second processor is given permission to use the interface. In this figure, the PIN# and POUT# shown are the signals of the original processor and not those of the second processor. The POUT# signal of the second processor is connected to the PIN# of the original processor, however, and the PIN# signal of the second processor is connected to the POUT# of the original processor. This is illustrated in the figure by showing the PIN# and POUT# signals of the second processor in parentheses underneath the respective POUT# and PIN# signals of the original processor. Use of the PCI bus is requested at clock IC by the second processor by asserting its POUT# (which is actually PIN# in the diagram). The original processor detects this on clock 2C and asserts its POUT# on clock 3C. The second processor then becomes the owner of the bus and deasserts its POUT# in clock 4C. Thus, once the second processor becomes the owner, the second processor performs the arbitration function to determine when the original processor should again have bus access by becoming the owner once again. In clock 4C, the second processor starts a transaction.

Ownership changes whenever PIN# and POUT# are sampled active together. Because the original processor requires use of the PCI bus again, the original processor keeps POUT# active on clock 4C. On clock 5C, the second processor grants access back to the original processor by asserting its POUT# (i.e., PIN#). It is not required that either processor immediately grant the other processor access to the bus. In general, however, the two processors would alternate accesses on the bus. On clock 5C, the original processor has become the new owner. The new owner, however, has to wait until the bus is idle before it can start a transaction. Thus, it is not until clock 7C that the original processor can start a transaction. It should be noted, however, that the second processor could also have kept PIN# asserted in clock 4C. In that case, the ownership would have changed hands on clock 4C. The new owner still would have had to wait until the bus was idle before it could start a new transaction, however.

Referring now to FIG. 7, examples of bus grant arbitration are illustrated wherein the bus grant is offered by the bus owner to the processor that is not the bus owner. In FIG. 7, the original processor offers the bus to the second processor on clock 2D. The second processor then requests the bus on clock 3D. As a result of ownership change to the second processor on clock 3D (i.e., because POUT# and PIN# are sampled active), the second processor can initiate an access on clock 4D. The second processor also offers the bus to the original processor on clock 4D and then withdraws the offer on clock 5D. On clock 6D, the second processor again offers the bus ownership to the original processor. Because the original processor asserts the bus request on clock 6D, the bus ownership changes back to the original processor. The original processor is then able to initiate its access on clock 7D. It should be noted that if the original processor were to have requested the bus on clock 5D, bus ownership would have changed to the original processor on clock 6D. In either case, however, the original processor will have to wait for the bus to become idle on clock 7D before it can initiate a new access.

Figure 8:
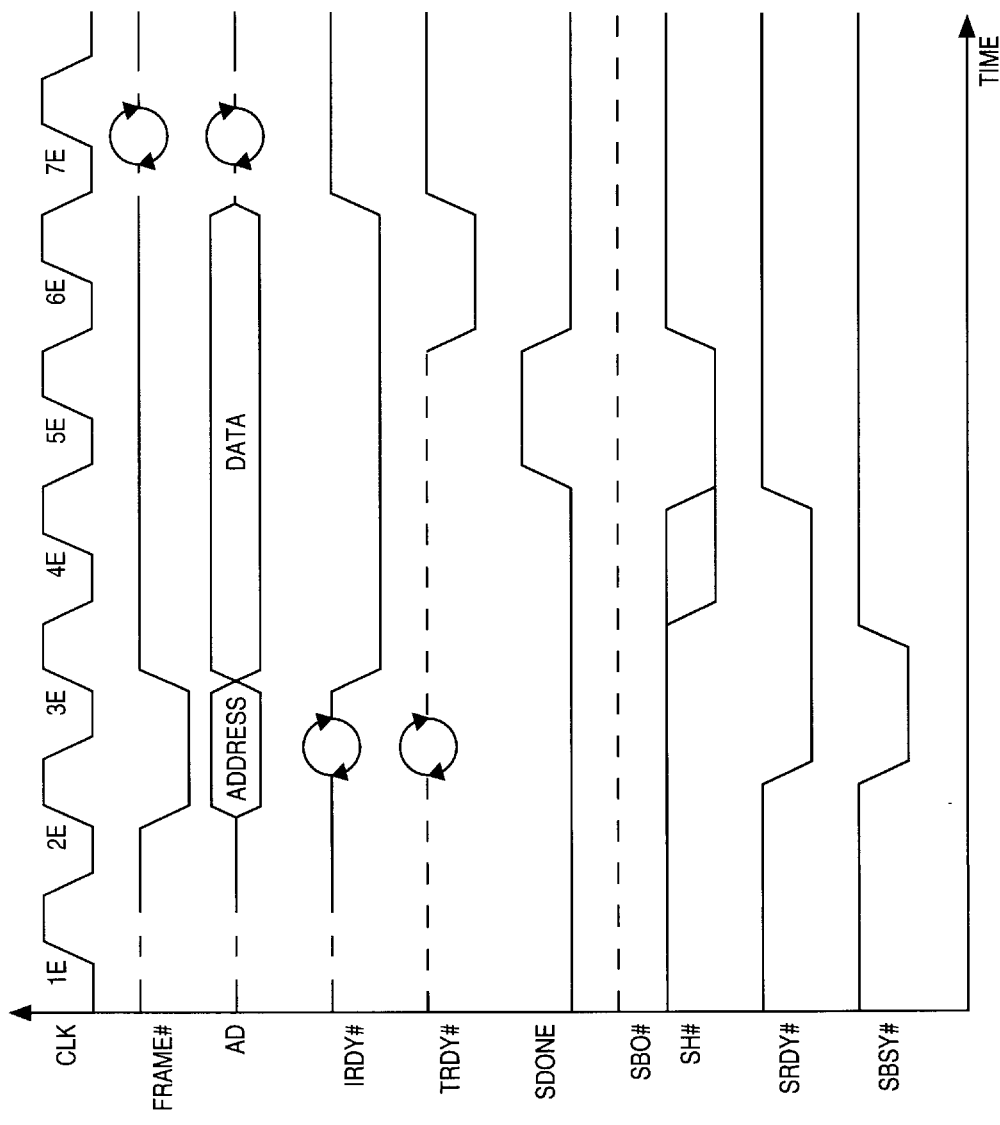
FIG. 8 illustrates the insertion of wait states until a snoop completes.

Referring now to FIG. 8, the snooping support signals will be described. In the PCI specification, SDONE is driven by the snooping cache-CPU on the bus to indicate the availability of the snoop result. In a dual or application upgrade processor arrangement, to indicate the availability of the snoop result SDONE will only be driven by the original processor. To coordinate different or varying snoop windows between the original processor and the second processor, SBSY# is used.

SBSY# (Snoop Busy) is defined to be driven by the second processor to the original processor. It is used to indicate whether or not the snoop by the second processor has been completed. If the second processor can complete snooping in one cycle, SBSY# will not be asserted. If the second processor cannot complete snooping within one clock after the snoop starts, SBSY# is asserted. SBSY# is then deasserted one cycle before the snoop result from the second processor is available. For one embodiment, SBSY# is internally pulled up by the original processor to insure that SBSY# does not float when no second processor is present.

SH# (Share) is driven by either the second processor or the original processor to indicate that there is a snoop hit to a clean line. SH# is a s/t/s signal. Because GNT# from the system arbiter is connected to both processors, to avoid SH# being driven by more than one processor at a time, SH# is driven only if the transaction is a memory read and the other processor is the master. On the basis of SH# and SBO#, the processor cache that initiates the memory read transaction can then determine the MESI state in which the cache line should be. SH# is to be sampled on the first clock when SDONE is asserted and deasserted the following clock. For one embodiment, SH# is internally pulled up to insure it does not float when no second processor is present.

The original processor and the second processor share and drive the SBO# line. Because only one processor should drive the SBO# line one at a time, only the processor-cache that has a snoop hit to a modified line should drive the SBO# line.

SDONE will be asserted by the original processor when its internal snooping is completed and the SBSY# from the second processor is sampled deasserted. SDONE is then deasserted by the original processor according to the standard PCI protocol.

The PCI specification defines SDONE and SBO# to provide information between agents that participate in the cache protocol. There are three cache states that appear on PCI: STANDBY, CLEAN and HITM. When SDONE is asserted, it indicates that the snoop has completed (i.e., SDONE is deasserted during the STANDBY state). When SBO# and SDONE are both asserted, it indicates a hit to a modified line (i.e., the HITM state). When SBO# is deasserted and SDONE is asserted, it indicates that no cache conflict exists and therefore the memory access can complete normally (i.e., the CLEAN state).

Figure 10:
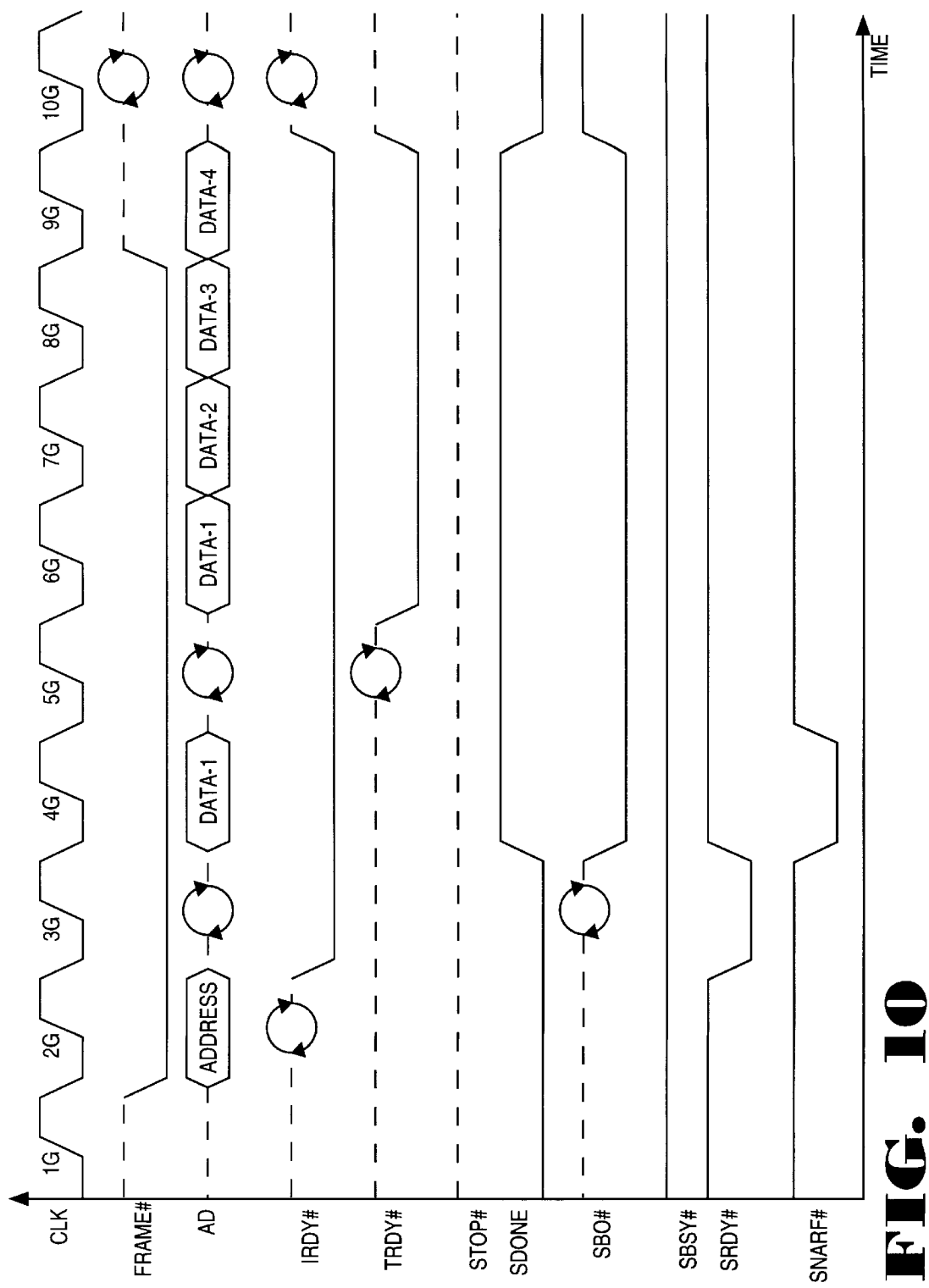
FIG. 10 illustrates a memory read transaction wherein the cache provides data.

SNARF#, an optional sideband signal defined to support read intervention, is shown in FIG. 10. The PCI specification specifies a retry mechanism for a read transaction that results in a snoop hit to a modified line. The standard PCI retry mechanism incurs an overhead of two unnecessary memory access transactions, however, because the read access is first backed off, then the modified line is written back and the read access is initiated again. The SNARF# signal is used to provide a mechanism to remove this overhead.

Thus, SNARF# is used in conjunction with SDONE and SBO# to indicate that the cache has the requested data and is capable of providing it in the order requested. SNARF# is a s/t/s signal. SNARF# can only be asserted with HITM when the cache is capable of providing the modified data in the order requested. Thus, when the cache indicates HITM, it may or may not assert SNARF#. SNARF# is deasserted when the cache has placed data on the bus and is able to complete a new data phase on each PCI clock.

In the PCI specification, on a snoop hit to a modified line in a cache, the cache will write the modified line back to the memory subsystem. This procedure requires three transactions on the bus. The PCI signal STOP# (Stop) indicates that the current target is requesting the master to stop the current transaction. Thus, the first transaction occurs when the master requests the data and is terminated with retry (i.e., STOP# asserted) because the snoop resulted in HITM. The second transaction occurs when the cache writes the modified line back to memory. The third and final transaction occurs when the master re-requests the data and completes the transfer with the memory controller. The number of transactions required to complete this transfer can be reduced from three to one if the memory controller and the cache coordinate the data transfer. This coordination is accomplished by supporting SNARF#. A cache, however, is not required to assert SNARF# on all transactions it signals HITM. For example, the cache may provide data when the burst sequence is linear or only zero based (i.e., A2 and A1 both zero).

When the cache can provide the modified data in the requested order, the cache asserts SNARF# the same time it drives HITM on the bus. If the memory controller supports snarfing, it does not assert STOP# (when it detects HITM), but instead holds the transaction in wait states.

When the memory controller detects HITM, it is required to tri-state the AD lines on the next clock regardless of the state of SNARF#. Thus, the cache insures at least one turn-around cycle between the memory controller tri-stating the AD lines and when it starts driving the AD lines with the first data requested. When the cache is ready to continue the transfer, it deasserts SNARF# indicating to the memory controller that valid data is present on the bus. To use SNARF#, the cache guarantees that once SNARF# has been deasserted the cache is able to provide new data upon each clock both IRDY# and TRDY# are asserted until an entire cache line has been transferred. The cache also has to provide the data in the requested order when SNARF# is asserted. Thus, for example, if the cache can only provide data in linear order and the current transaction requests the data as cacheline wrap, then the cache can not assert SNARF# when HITM is signaled.

The memory controller is informed that the cache will provide the data to the master if SNARF# is asserted when HITM is signaled. The memory controller will therefore latch and update the array with the data. If the master terminates the transaction before the entire line is transferred, the cache remains responsible for the entire line. The memory controller may discard the data that was transferred, because the cache is required to write back the entire line whenever any data (in the cache line) is not transferred. The cache continues to signal HITM on the bus and asserts its REQ# line, if it is going to write back the modified line. All cacheable transactions are terminated with retry by the memory controller while HITM is signaled. The cache performs the write back as it would any write back caused by a snoop. If the cache determines to keep the modified line (by putting the line back in the cache as modified), instead of writing it back, CLEAN can be signaled and followed by STANDBY. Because the hit to a modified line has been resolved, once HITM has been removed from the bus, the memory controller can then continue with normal operation.

If a parity error is detected, the memory controller will not assert PERR# because it is not the true recipient of the data. On a read transaction the assertion of PERR# is the responsibility of the master. Thus, if a parity error occurs the master must take the appropriate action (e.g., repeat the transaction, set a status bit or do nothing.) If the entire line is transferred to the master and the memory controller detects a parity error, however, the memory controller has a couple of options with respect to how to handle the error. For one embodiment, the memory controller will assert SERR# because the data it has contains an error and any subsequent read may provide corrupted data. Alternately, the memory controller can guarantee that a parity error occurs on any subsequent read of the affected line. This allows a subsequent write to the line that will over-write the bad data and thereby fix the parity error. Although the first approach causes a catastrophic system error, the second approach may allow the system to continue operation.

The memory controller is permitted to insert wait states until it is ready to complete a transfer. This feature is useful, for example, when the previous transaction has filled the write buffer of the memory controller. Thus, the memory controller can insert wait states until the buffer is free and then the transaction can continue. In this case, insertion of a few wait states is more efficient than terminating the transaction with retry and thereby causing two subsequent additional transactions on the bus.

The diagram in FIG. 8 illustrates the timing associated with the PCI cache protocol including the second processor sideband signals and their interaction. In the diagram a new signal called SRDY# is used. SRDY# is an internal signal from the cache to the PCI interface logic. When SRDY# is asserted, the cache has completed the snoop.

The transaction in FIG. 8 starts when an address is latched on clock 2E. The target then keeps TRDY# deasserted and inserts wait states until the snoop completes. The snoop completes on clock 5E when SDONE is sampled asserted. Because SBO# was not asserted when SDONE was asserted, the snoop result indicates CLEAN. Because the target waited for the snoop to complete, the transaction must be cacheable. SDONE is driven by the original processor and is asserted when SRDY# is asserted and SBSY# is deasserted. In this figure, SRDY# is asserted on clock 3E, but SBSY# is not deasserted until clock 4E. Thus, in this example, the snoop window of the original processor is one clock smaller than that of the second processor.

If the transaction is a memory read to a cacheable location, the target will insert wait states until the snoop completes. The memory controller will access the requested data and then start driving the requested data onto the bus. The target will continue to insert wait states (i.e., TRDY# will be kept deasserted) until SDONE is asserted.

In FIG. 8, SH# is shown to be asserted on clock 4E or clock 5E and then deasserted on clock 6E. If the read transaction is from the second processor, the original processor will assert SH# as soon as its internal snoop is asserted by deasserting SRDY# (i.e., at clock 4E). If the read transaction is from the original processor, the second processor will assert SH# as soon as its internal snoop is asserted by deasserting SRDY# (i.e., at clock 5E). After SDONE has been asserted, SH# will be deasserted on the following clock.

Figure 9:
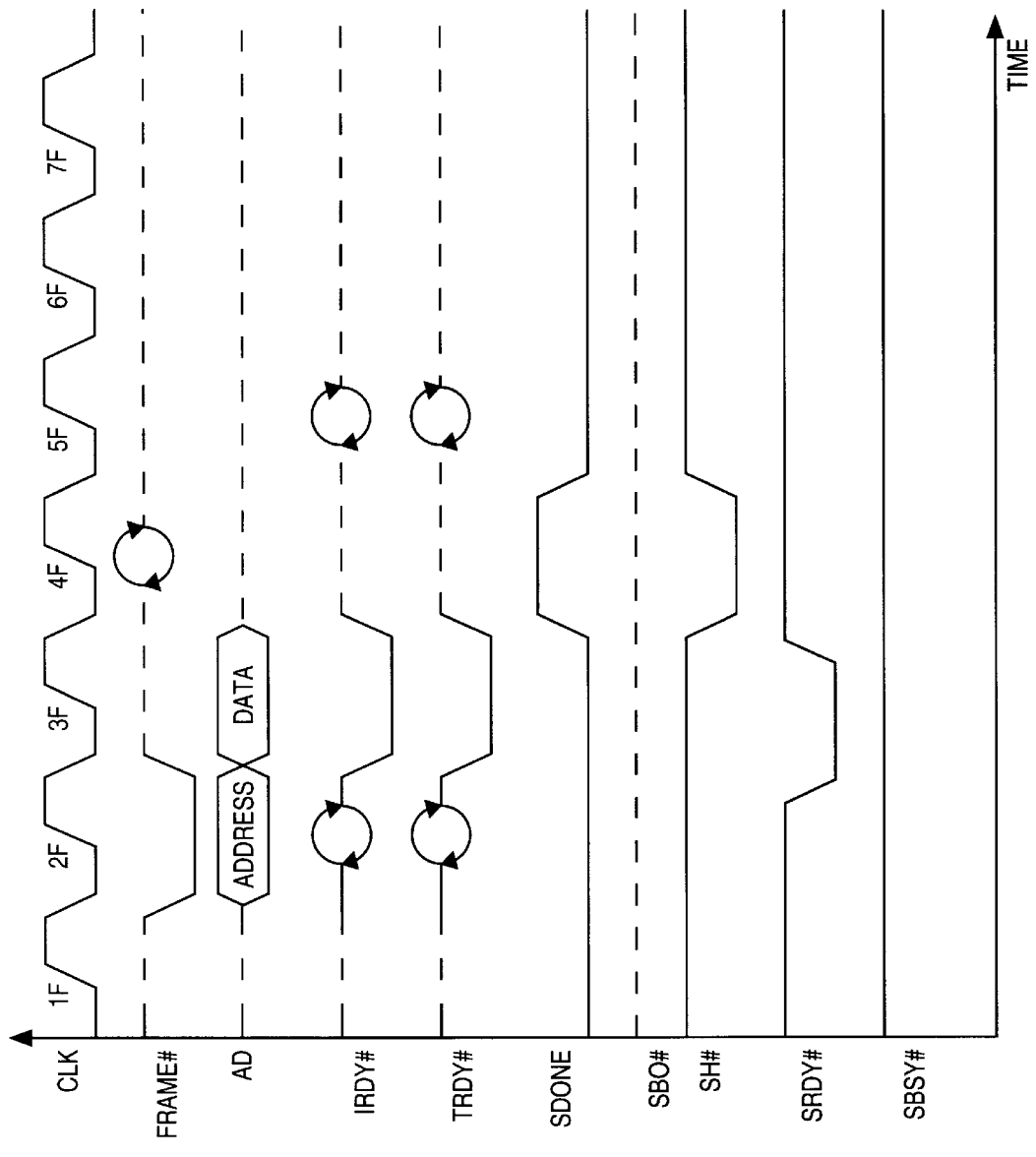
FIG. 9 illustrates a transaction completion before a snoop result is indicated.

The transaction in FIG. 9 starts the same as FIG. 8. In FIG. 9, however, the target completes the data transfer before the snoop result has been indicated. Thus, the target of this transaction is either non-cacheable or cacheable. If the transaction is non-cacheable, SDONE and SBO# have no effect on how the transaction is terminated. If the transaction is cacheable, then no other address is queued and the target will merge the write back data with the original data if the snoop results in HITM (this case is shown in FIG. 10). In FIG. 9, the memory controller ascertains on clock 4F that the data it accepted on clock 3F is correct. Because the memory controller accepted data on clock 3F, instead of waiting for SDONE to be asserted on clock 4F and then latching the data on clock 5F, the memory controller will complete the transaction two clocks earlier than would have been the case. In this figure, SRDY# is asserted on clock 3F but SBSY# is not asserted. The original processor and the second processor have the same snooping window. Thus, SH# is asserted on clock 4F and deasserted on clock 5F (the clock following the SDONE assertion).

FIG. 10 is an example of a read intervention during a memory read transaction that hits a modified line in the cache. When both HITM# is indicated and SNARF# is asserted, it indicates that the cache has the data and will provide the data in the requested order.

Thus, the cache will monitor STOP# while it prepares to provide the data. If STOP# is asserted, the transaction is terminated and the cache will write the modified line back to memory when it gains access to the bus. On the other hand, if the memory controller does not assert STOP#, the cache will continue by providing the data. In the figure, the memory controller tri-states the AD bus the clock after HITM is detected. The clock following HITM is a turn-around cycle for the AD lines. On clock 5G, the cache indicates that it is ready to provide the data by deasserting SNARF#. The memory controller samples SNARF# deasserted (on clock 5G), asserts TRDY#, and the first data transfers on clock 6G. The memory controller can terminate the transaction at anytime by asserting STOP#. The memory controller can also insert wait states by deasserting TRDY#. The cache will provide new data each clock that both IRDY# and TRDY# are asserted. The cache is capable of providing new data on each PCI clock until an entire cache line is transferred. The memory controller will terminate the transaction at the cache line boundary if the master tries to continue the burst beyond the cache line boundary.

After the entire line has been transferred, the cache will transition from HITM to CLEAN to STANDBY. On the other hand, if the master terminates the transaction before the entire line has been transferred, the cache will remain responsible for the line. Therefore, the cache will continue to signal HITM and then write the full line back when access to the bus is granted. In this case, data that the memory controller latched during the intervention cycle can be discarded because the cache will write back the entire line when it gains access to the bus. The cache will transitions from HITM to CLEAN during the address phase and then transfer the entire line to memory.

The PCI bus protocol allows many optional performance enhancement features that are associated with the support of caches on the PCI bus. Although the enhancements within the cache and the memory controller are orthogonal, the performance associated with a particular enhancement may not be realized, however, unless both the cache and memory controller support the enhancement. These enhancements are determined on a transaction by transaction basis and are not determined with configurable parameters. This means that in a system where one cache may support some options and a second cache supports them all, both will work with the memory controller. A difference in the performance achieved by the combination of the cache and memory controller will be experienced, however. The performance may change by transaction when different caches are used or even within the same cache based upon the transaction type. All combinations are supported with the least common denominator will be used on a given transaction.

SYSTEM SIGNALS

In the previous discussion, significant signals and protocols have been presented that provide advanced memory bus capabilities to a high speed peripheral bus. For completeness, additional system signals are presented hereafter briefly. The following system signal discussion will be based upon system signals of the sort used by i486 or Pentium processors. It is to be understood, however, that these signals are merely representative examples of system signals such as are used by other types of processors. The system signals discussion can be divided into six subsections based upon signal categories. The system signal categories are: initialization, PC compatibility, cache control, interrupt, power management, buffer management and scan path. A detailed description of the signals and their timings, can be found in the i486 or the Pentium processor specifications.

Initialization Signals

The RESET (Reset) signal forces the CPU(s) to begin execution at a known state. All CPU internal caches and the second level cache (if present) will be invalidated upon the reset. Modified lines in a cache are not written back. When Reset is asserted, the CPU will immediately abort all bus activity and perform the RESET sequence.

The INIT (Initialize) signal forces a CPU to begin execution at a known state without flushing the caches or affecting the floating point state. The CPU state after INIT is the same as the state after RESET except that the internal caches, model specific registers, and floating point registers retain the values they had prior to INIT.

Compatibility Signals

The A20M# (Address bit 20 Mask) signal is used to emulate the 1 Megabyte address wrap around of the 8086 processor. When A20M# is asserted, the physical address bit 20 of a memory access is masked before a lookup to the internal cache or the memory address is driven onto the bus.

The FERR# (Floating Point ERRor) signal is driven active by the CPU when an unmasked floating point error occurs. It is included for compatibility with systems using DOS type floating point error reporting.

The IGNNE# (IGNore Numeric Exception) signal, when asserted, forces the CPU to ignore any pending unmasked numeric exception and continue executing floating point instructions for the entire duration that this pin is asserted.

The FLUSH# (cache flush) signal, when asserted, forces the CPU to write back all modified lines in the data cache and invalidate its internal cache(s). A flush acknowledge special cycle will then be generated by the CPU to indicate completion of the invalidation and write back.

Cache Control Signal

The FLSH_ACK# (Cache Flush Acknowledge) signal is used during a cache flush and write back special cycle. When a cache flush and write back special cycle is generated by a CPU, the CPU will generate no other bus cycle until the FLSH_ACK# pin is asserted.

Interrupt Signals

There are four types of interrupts related signals. They are: INTR, NMI, PICCLK and PICD.

The INTR (INTeRrupt) input signal indicates that an external interrupt has been generated. Upon recognizing the interrupt request, the CPU will generate an interrupt acknowledge bus cycle in response to the INTR pin going active.

The NMI (Non Maskable Interrupt) request input signal indicates than an external non-maskable interrupt has been generated.

The PICCLK (Advanced Programmable Interrupt Controller (APIC) clock) is the serial data bus clock signal for the APIC.

The PICD(1:0) signals carry the data portion of the APIC three-wire serial bus.

Power Management Support Signals

The SMI# (System Management Interrupt) signal indicates that a system management interrupt has occurred.

The SMIACT# (System Management Interrupt ACTive) signal indicates that the processor is operating in system management mode (SMM).

The STPCLK (SToP CLock) signal is asserted to cause an internal clock (e.g. the internal clock of a CPU) to stop and to cause the core to consume less power. When asserted, however, the CPU-Cache will still respond to interprocessor and external snoop requests. For one embodiment, this signal is supported using PCI special cycles.

Buffer Management Signals

The following is a set of optional signals that are used in a system configuration wherein the memory does not reside on the PCI bus.

The FLSHREQ# (Flush Request) signal is generated to command all of the posted write buffers of the system that are pointing towards PCI to be flushed. This is used before granting an ISA bus to an ISA master, or to a DMA, to avoid a deadlock situation.

The MEMACK# (Memory Acknowledge) signal is a response handshake to FLSHREQ# that is used to indicate that the buffers have been flushed.

Scan Path Signals

The TCK (Testability Clock Input) signal provides a boundary scan clocking function.

The TDI (Test Data Input) signal is an input used to receive serial test data and instructions The TDO (Test Data Output) signal is used to serial test data and instructions as output.

The TMS (Test Mode Select Input) signal is used to control TAP controller state transition.

SYSTEM ERROR MODEL

In the previous discussion, significant PCI system error signals and protocols have been presented and discussed as they affect providing advanced memory bus capabilities to a high speed peripheral bus. For completeness, additional PCI system error signals are presented hereafter briefly. A detailed description of the signals and their timings, can be found in the PCI specification.

PCI uses the PERR# to signal a data parity error between connected devices on the PCI (except on Special Cycle commands). On a data parity error during a write transaction, the target device will assert the PERR# pin as specified in the PCI specification. On a data parity error during a read, the bus master will assert the PERR# pin as specified in the PCI specification. The bus master has the option of asserting SERR# or not asserting SERR# in response to PERR#. In the case of a CPU, it has the option of vectoring to an internal fault handling routine or asserting SERR#. In any case, the PDG (PERR Detected or Generated) bit in the status configuration register will be set whenever PERR# is driven by the target of a CPU initiated transaction.

In the absence of a DEVSEL# response on the PCI bus (i.e., an access to non-existing device), the bus master will initiate a Master-abort Termination. In addition, a read will result in a read of all ones and a write will result in the data being dropped. The MAD (Master-Abort Detected) bit will also be set in the status configuration register. As in the PC architecture (i.e., the normal case), access to a non-existing device will not cause any further indication (e.g., scanning to determine the memory boundary and size).

A target abort termination is initiated when the target requires the transaction to be terminated without the aborted transaction being tried again. Depending upon implementation, the bus master may assert SERR# or not assert SERR# (e.g., retry with smaller data transfer size access). In the case of a CPU, it has the option of vectoring to an internal fault handling routine or asserting SERR#.

Finally, any condition on PCI signals that does not make sense can be signaled as a SERR#, (e.g., a partial cache line fill, an illegal control sequence, etc.).

Although the method and apparatus of the present invention has been described in terms of its presently preferred and alternate embodiments, those skilled in the art will recognize that the present invention may be practiced with modification and alternation within the spirit and scope of the appended claims. The specifications and drawings are, accordingly, to be regarded in an illustrative rather than a restrictive sense.

What is claimed is:

1. A method of sharing a common signal line coupled to a first and second agent, the method comprising the steps of:

initially assigning ownership of the common signal line to the first agent;

if the second agent requires use of the common signal line, the second agent using a first signal line to request ownership from the first agent;

after receiving a request of ownership from the second agent, the first agent using a second signal line to signal transfer of ownership;

if the first agent requires use of the common signal line after transfer of ownership to the second agent, the first agent using the second signal line to request ownership from the second agent; and after receiving a request of ownership from the first agent, the second agent using the first signal line to signal transfer of ownership.

2. An apparatus for sharing a common signal line coupled to a first and second agent, the first agent initially having ownership of the common signal line, the apparatus comprising:

first signal means for the second agent to request ownership from the first agent if the second agent requires use of the common signal line; and second signal means for the first agent to signal transfer of ownership to the second agent after receiving a request of ownership from the second agent, wherein;

if the first agent requires use of the common signal line after transfer of ownership to the second agent, the second signal means for further requesting ownership from the second agent.

3. The apparatus as set forth in claim 2, wherein:

after receiving a request of ownership from the first agent, the first signal means for further signaling transfer of ownership to the first agent.

4. An apparatus for sharing a common signal line coupled to a first and second agent, the apparatus comprising:

a first signal line coupling the first and second agents, wherein:

if the first agent has ownership of the common signal line and the second agent requires use of the common signal line, the second agent using the first signal line to request ownership from the first agent;

if the second agent has ownership of the common signal line, the second agent using the first signal line to transfer ownership of the common signal line to the first agent upon a request from the first agent; and a second signal line coupling the first and second agents, wherein:

if the second agent has ownership of the common signal line and the first agent requires use of the common signal line, the first agent using the second signal line to request ownership from the second agent;

if the first agent has ownership of the common signal line, the first agent using the second signal line to transfer ownership of the common signal line to the second agent upon a request from the second agent.

5. A system comprising:

a first agent having an output and an input;

a second agent having an output and an input;

a common signal line coupled between the first and second agents and shared by the first and second agents;

a first signal line coupling the output of the second agent to the input of the first agent;

a second signal line coupling the output of the first agent to the input of the second agent, wherein the first agent requests ownership of the common signal line from the second agent over the second signal line, and the second agent grants ownership of the common signal line to the first agent over the first signal line, and wherein the second agent requests ownership of the common signal line from the first agent over the first signal line, and the first agent grants ownership of the common signal line to the second agent over the second signal line.

6. A method of sharing a common signal line coupled to a first and second agent, the method comprising the steps of:

initially assigning ownership of the common signal line to the first agent;

the first agent offering ownership of the common signal line to the second agent over a first signal line; and the second agent signaling acceptance of ownership of the common signal line to the first agent over a second signal line.

7. The method as set forth in claim 6, further comprising the steps of:

the second agent using the first signal line to offer ownership to the first agent; and the first agent signaling acceptance of ownership of the common signal line to the second agent over the second signal line.

8. An apparatus for sharing a common signal line coupled to a first and second agent, the first agent initially having ownership of the common signal line, the apparatus comprising:

first signal means for the first agent to offer ownership of the common signal line to the second agent; and second signal means for the second agent to signal acceptance of the transfer of ownership from the first agent;

wherein if the second agent has ownership, the second signal means for further offering ownership from the second agent to the first agent.

9. The apparatus as set forth in claim 8, wherein:

after receiving the offer of ownership from the second agent, the first signal means for further signaling acceptance of the transfer of ownership from the second agent to the first agent.

10. An apparatus for sharing a common signal line coupled to a first and second agent, the apparatus comprising:

a first signal line coupling the first and second agents, wherein the first agent offers ownership of the common signal line to the second agent over the first signal line; and a second signal line coupling the first and second agents, wherein the second agent signals acceptance of ownership of the common signal line over the second signal line;

wherein the second agent offers ownership of the common signal line to the first agent over the second signal line.

11. The apparatus as set forth in claim 10, wherein:

the first agent signals acceptance of ownership of the common signal line over the first signal line.

12. A system comprising:

a first agent having an output and an input;

a second agent having an output and an input;

a common signal line coupled between the first and second agents and shared by the first and second agents;

a first signal line coupling the output of the second agent to the input of the first agent;

a second signal line coupling the output of the first agent to the input of the second agent, wherein the first agent offers ownership of the common signal line to the second agent over the second signal line, and the second agent signals acceptance of ownership of the common signal line to the first agent over the first signal line, and the second agent offers ownership of the common signal line to the first agent over the first signal line.

13. The system as set forth in claim 12, wherein:

the first agent signals acceptance of transfer of ownership of the common signal line to the second agent over the second signal line.

14. An electronic device for coupling to a bus having a common signal line shared between the electronic device and at least one other electronic device, the electronic device comprising:

first signal means for offering transfer of ownership of the common signal line to the at least one other electronic device when the electronic device operates in a first mode; and second signal means for receiving an acceptance of the offer for transfer of ownership when the electronic device operates in the first mode, wherein the second signal means for receiving an offer for ownership of the common signal line when the electronic device operates in a second mode.

15. The electronic device of claim 14, wherein:

the first signal means for signaling acceptance of the transfer of ownership of the common signal line when the electronic device operates in the second mode.

16. An electronic device for coupling to a bus having a common signal line shared between the electronic device and at least one other electronic device, the electronic device comprising:

first signal means for requesting ownership of the common signal line in a first operating mode of the electronic device, and for granting ownership of the common signal line to the at least one other electronic device in a second operating mode; and second signal means for receiving a gra nt of ownership of the common signal line in the first operating mode of the electronic device, and for receiving a request of ownership of the common signal from the at least one other electronic device in the second operating mode.

* * * * *